(12) United States Patent
Uchida (10) Patent No.: US 10,723,915 B2
(45) Date of Patent: Jul. 28, 2020

(54) HARD COATING COMPOSITION

(71) Applicant: Itoh Optical Industrial Co., Ltd., Aichi (JP)

(72) Inventor: Naoki Uchida, Aichi (JP)

(73) Assignee: Itoh Optical Industrial Co., Ltd., Aichi (JP)

( * ) Notice: Subject to any disclaimer, the term of this patent is extended or adjusted under 35 U.S.C. 154(b) by 124 days.

(21) Appl. No.: 16/199,407

(22) Filed: Nov. 26, 2018

(65) Prior Publication Data

US 2020/0165486 A1    May 28, 2020

(51) Int. Cl.

| | |
|---|---|
| G02B 1/14 | (2015.01) |
| C09D 183/08 | (2006.01) |
| C09D 7/62 | (2018.01) |
| C08G 77/28 | (2006.01) |
| C08K 9/04 | (2006.01) |
| G02B 1/04 | (2006.01) |
| G02B 1/113 | (2015.01) |
| C08K 3/22 | (2006.01) |

(52) U.S. Cl.
CPC ............ *C09D 183/08* (2013.01); *C08G 77/28* (2013.01); *C08K 3/22* (2013.01); *C08K 9/04* (2013.01); *C09D 7/62* (2018.01); *G02B 1/041* (2013.01); *G02B 1/113* (2013.01); *G02B 1/14* (2015.01); *C08G 2150/00* (2013.01); *C08K 2003/2241* (2013.01)

(58) Field of Classification Search
None
See application file for complete search history.

(56) References Cited

U.S. PATENT DOCUMENTS

| | | | |
|---|---|---|---|
| 4,294,950 A | 10/1981 | Kato | |
| 5,322,888 A | 6/1994 | Kato et al. | |
| 6,296,943 B1 | 10/2001 | Watanabe et al. | |
| 6,497,958 B1 | 12/2002 | Abe et al. | |
| 6,773,465 B1 * | 8/2004 | Murai | G02B 1/111 8/471 |
| 7,147,749 B2 | 12/2006 | Nishimoto et al. | |
| 7,566,379 B2 | 7/2009 | Nishimoto et al. | |
| 2004/0060661 A1 | 4/2004 | Nishimoto et al. | |

(Continued)

FOREIGN PATENT DOCUMENTS

| | | |
|---|---|---|
| EP | 1162245 A1 | 12/2001 |
| EP | 1947155 A1 | 7/2008 |

(Continued)

*Primary Examiner* — Peter A Salamon
(74) *Attorney, Agent, or Firm* — Nakanishi IP Associates, LLC (57) ABSTRACT

A hard coating composition applied to an optical element body formed of organic glass. The hard coating composition contains a hydrolyzate of alkoxysilane as a main agent, a polyvalent organic carboxylic acid and a nitrogen-containing compound as auxiliary agents, and a metal oxide colloid as a refractive index control agent. The alkoxysilane contains a epoxy group-containing trialkoxysilane as a first component, tetraalkoxysilane as a second component, and a sulfide bonded tetraalkoxysilane as a third component. The hard coating composition has practical abrasion resistance by the first component and the second component, and a blending amount of the third component is an amount not impairing the practical abrasion resistance.

10 Claims, 1 Drawing Sheet

(56) References Cited

U.S. PATENT DOCUMENTS

| | | |
|---|---|---|
| 2006/0204718 A1 | 9/2006 | Kawakami |
| 2006/0251884 A1 | 11/2006 | Naito et al. |
| 2007/0034337 A1 | 2/2007 | Nishimoto et al. |
| 2008/0026210 A1 | 1/2008 | Iijima et al. |
| 2008/0286583 A1 | 11/2008 | Mori et al. |
| 2009/0029153 A1 | 1/2009 | Naito et al. |
| 2011/0058142 A1 | 3/2011 | Berit_Debat et al. |
| 2013/0164539 A1* | 6/2013 | Fukushima .......... C09D 183/04 428/412 |
| 2015/0024212 A1* | 1/2015 | Uchida .................. G02B 1/14 428/413 |

FOREIGN PATENT DOCUMENTS

| | | |
|---|---|---|
| EP | 2275841 A2 | 1/2011 |
| EP | 2829583 B1 | 3/2016 |
| JP | S57-42665 B2 | 9/1982 |
| JP | H04-027168 A | 1/1992 |
| JP | H07-076671 A | 3/1995 |
| JP | 2577670 B | 2/1997 |
| JP | H10-292135 A | 11/1998 |
| JP | 2000-063119 A | 2/2000 |
| JP | 2006-131899 A | 5/2006 |
| JP | 3878113 B2 | 2/2007 |
| JP | 2007-188103 A | 7/2007 |
| JP | 2007-246351 A | 9/2007 |
| JP | 4069330 B2 | 4/2008 |
| JP | 2009-155541 A | 7/2009 |
| JP | 4589115 B2 | 12/2010 |
| JP | 2011-136850 A | 7/2011 |
| JP | 5819743 B2 | 11/2015 |
| WO | 2006/001487 A1 | 1/2006 |

* cited by examiner

HARD COATING COMPOSITION

CROSS REFERENCE TO RELATED APPLICATION

A hard coating composition according to the present invention shares a main agent (hydrolyzate of alkoxysilane) and an auxiliary agent (a curing agent) with the hard coating composition in the invention of U.S. Pat. No. 4,294,950 (hereinafter referred to as Kato) and U.S. Publication No. US2015/0024212A1 (hereinafter referred to as Uchida). The assignee of the U.S. Patent and the U.S. Publication is the same as the assignee of the present application. Therefore, in the present specification, the U.S. Publication is subject to Incorporation By Reference (IBR).

BACKGROUND OF THE INVENTION

1. Field of the Invention

The present invention relates to a hard coating composition applied to an optical element body formed of organic glass. Here, optical elements include not only lens components such as spectacle lenses and lenses for cameras, but also sunglasses, covers for lighting equipment, reflecting mirrors, prisms, filters and the like.

The following description will mainly be described taking the spectacle lenses as an example, but it is not limited thereto. Further, a composition unit is a mass unit unless otherwise specified.

2. Description of Related Art

Organic glass used as an optical lens has been generally popular because of its light weight, excellent impact resistance, dyeability and easy processing as compared with conventional inorganic glass.

However, in a state of the organic glass, it has a disadvantage that it has low abrasion resistance to be easily scratched as compared with the inorganic glass.

Therefore, for example, in Kato and Uchida, the hard coating composition containing a hydrolyzate of alkoxysilane as the main agent and a polyvalent organic carboxylic acid (acid anhydride) and a nitrogen-containing compound as the curing agent has been proposed and widely used by the present applicant (Uchida [0022] to [0024]). As similar hard coating compositions, JP2577670, JP4589115 and the like can be mentioned in addition to Kato and Uchida.

Color lenses dyed for fashion have more opportunities to be used outdoors. Therefore, the color lenses having high weatherability adhesion without impairing abrasion resistance have been required more than before.

SUMMARY OF THE INVENTION

In view of the above, an object of the present invention is to provide the hard coating composition capable of providing the spectacle lenses having high weatherability adhesion without impairing abrasion resistance more than before, and the spectacle lenses using the hard coating composition.

Further, another object of the present invention is to provide the hard coating composition applicable to an organic glass base material having a high refractive index, and the spectacle lenses using the hard coating composition.

The hard coating composition of the present invention is a hard coating composition applied to an optical element body formed of organic glass. The hard coating composition contains as coating film-forming components a hydrolyzate of alkoxysilane as a main agent, a polyvalent organic carboxylic acid and a nitrogen-containing compound as auxiliary agents, and metal oxide colloid as a refractive index control agent. The alkoxysilane substantially contains: a first component: a trialkoxysilane represented by a rational formula (where $R^1$ is H or $CH_3$, $R^2$ is an alkylene group having 1 to 4 carbon atoms, and $R^3$ is an alkyl group having 1 to 4 carbon atoms); a second component: a tetraalkoxysilane represented by a rational formula $Si(OR^4)_4$ (where $R^4$ is an alkyl group having 1 to 4 carbon atoms); and a third component: a sulfide bonded trialkoxysilane (hereinafter referred to as S-trialkoxysilane) represented by a rational formula $(C_3H_6\text{—}Si(O\text{—}R^5)_3)Sx$ (where $R^5$ is an alkyl group having 1 to 2 carbon atoms and x is an integer of 1 to 5), and the first component and the second component are blended to have practical abrasion resistance (a Bayer value of 2.0 or more only with a hard coat) and a blending amount of the third component is an amount not impairing the practical abrasion resistance.

In the hard coating composition of the above configuration, a mixing ratio of the second component and the third component to the first component is preferably set to the following range. An effect of the present invention is remarkable.

the first component/the second component≈10/2 to 10/8
the first component/the third component≈10/0.05 to 10/0.7

Further, in the hard coating composition of the above configuration, the hard coating composition contains the metal oxide colloid as the refractive index control agent, and it is preferred that the metal oxide colloid is a rutile-based titania colloid having a particle diameter of 5 to 60 nm dispersed using an amine dispersant, and the amine dispersant is contained in an amount of 0.3 to 5.0 parts with respect to 100 parts of the titania colloid. In a case where the present invention is applied to the spectacle lenses having a high refractive index, a synergistic effect of weatherability (discoloration resistance) can be expected, and it is easy to obtain a product having abrasion resistance, weatherability adhesion and further weather discoloration and light discoloration resistance (see Tables 2 and 3).

DETAILED DESCRIPTION OF THE PREFERRED EMBODIMENTS

A main agent and auxiliary agents which are coating film-forming components of the present invention will be described.

The main agent is made of a hydrolyzate of alkoxysilane, and the alkoxysilane substantially includes the following first to third components.

The first component is a trialkoxysilane represented by a rational formula (where $R^1$ is H or $CH_3$, $R^2$ is an alkylene group having 1 to 4 carbon atoms, and $R^3$ is an alkyl group having 1 to 4 carbon atoms).

As the first component, those exemplified in Kato's second column, line 50 to third column, line 64 can be used. Among them, those exemplified in Uchida [0047] are preferable. $R^3$ is particularly preferably methyl or ethyl.

The second component is a tetraalkoxysilane represented by a rational formula $Si(OR^4)_4$ (where $R^4$ is an alkyl group having 1 to 4 carbon atoms).

As the second component, those exemplified in Uchida [0050] can be used. $R^4$ is particularly preferably methyl or ethyl.

The third component is a sulfide bonded trialkoxysilane represented by a rational formula $(C_3H_6—Si(O—R^5)_3)_2Sx$ (where $R^5$ is an alkyl group having 1 to 4 carbon atoms and x is an integer of 1 to 5).

As the third component, bis (3-trimethoxysilylpropyl) disulfide, bis (3-triethoxysilylpropyl) disulfide, bis (3-trimethoxysilylpropyl) tetrasulfide, bis (3-triethoxysilylpropyl) tetrasulfide and the like can be used. That is, $R^5$ is preferably 1 or 2 carbon atoms and x is an integer of 2 to 4.

One or more kinds of the first to third components are appropriately selected and used.

Here, a mixing ratio of the second component to the first component is the first component/the second component≈10/2 to 10/8, and preferably 10/2.5 to 10/7.5. When an amount of the second component is too small, it is difficult to obtain practical abrasion resistance on a coating film, and when it is too large, cracks are likely to occur on a surface of the coating film. Here, the practical abrasion resistance is a Bayer value of 2.0 or more, and preferably 2.2 or more.

Figure 1:
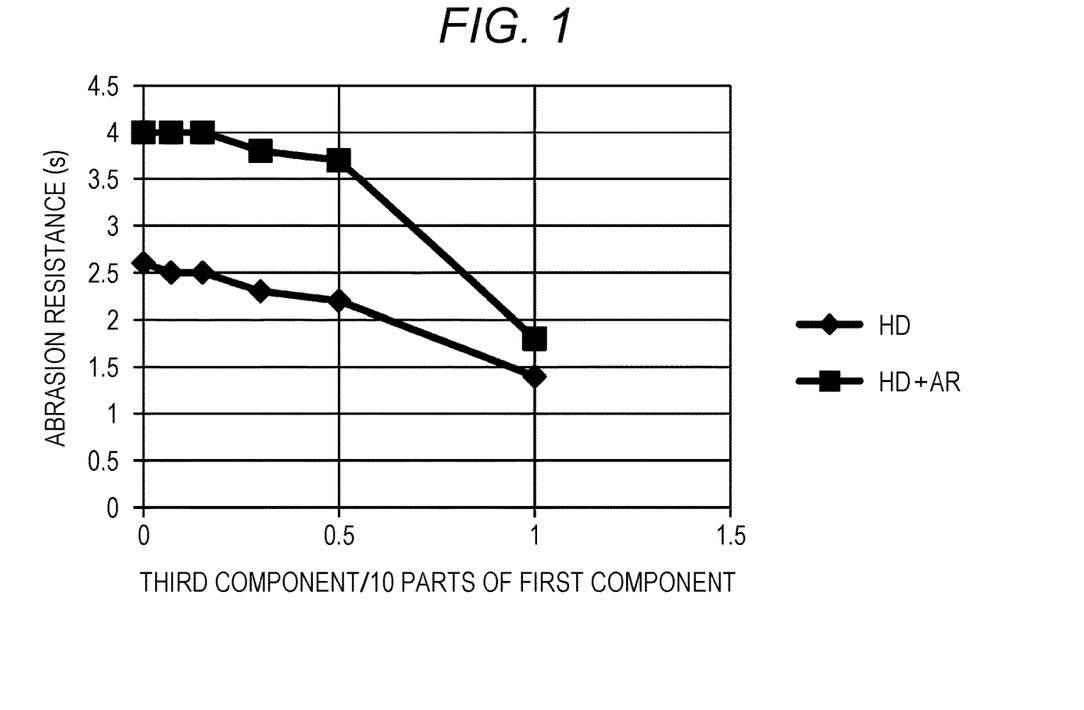
FIG. 1 is a graph showing a relationship between a mixing ratio of a third component to 10 parts of a first component in the hard coating composition and abrasion resistance.

A mixing ratio of the third component to the first component is the first component/the third component≈10/0.05 to 10/0.7, and preferably 10/0.1 to 10/0.6. When an amount of the third component is too small, it is difficult to secure improvement in weatherability adhesion to the coating film, and when it is too large, it is difficult to secure the practical abrasion resistance of the coating film (see FIG. 1).

Further, the hydrolyzate of each alkoxysilane can be obtained by a conventional method as described in Uchida [0051].

As the auxiliary agents, a polycarboxylic acid and a nitrogen-containing compound are essential. They cooperate to be responsible for a curing agent action. That is, they undergo condensation reactions with silanol groups after hydrolysis, and addition reactions with epoxy groups, etc., to be responsible for introduction and crosslinking structure of carboxyl groups and catalytic action.

As the polycarboxylic acid, those exemplified in Uchida [0079] can be used, and the mixing ratio with respect to the total alkoxysilane is the former/the latter=10/0.1 to 10/3, and preferably 10/0.15 to 10/2. When an amount of the polycarboxylic acid is too small, it is difficult to impart the dyeing property, and when it is too large, a coating material gels and the coating film tends to be cloudy.

As the nitrogen-containing compound, imidazoles or dicyandiamide are preferable, and dicyandiamide is particularly preferable in view of coating material stability. As imidazoles, those described in Kato's fifth column, second paragraph can be used. A mixing ratio of imidazoles or dicyandiamide to the total alkoxysilane is the former/the latter=10/0.1 to 10/2, and preferably 10/0.5 to 10/1. When an amount of the nitrogen-containing compound is too small, it is difficult to obtain properties such as adhesion necessary for the coating film, and when it is too large, the coating material tends to gel and it is difficult to secure necessary pot life.

As a refractive index control agent, a metal oxide colloidal sol is preferable. Specifically, a rutile-based colloid containing an amine dispersant described in Uchida [0056] to [0077] can be used in a form described in the paragraphs.

The hard coating composition of the above configuration can optionally be added with a trace amount of an ultraviolet absorber, an antioxidant, a disperse dye, an antistatic agent, surfactant or the like in order to improve coating film performance and appearance performance. As these drugs, those described in Uchida [0085] to [0090] can be suitably used.

Figure 2:
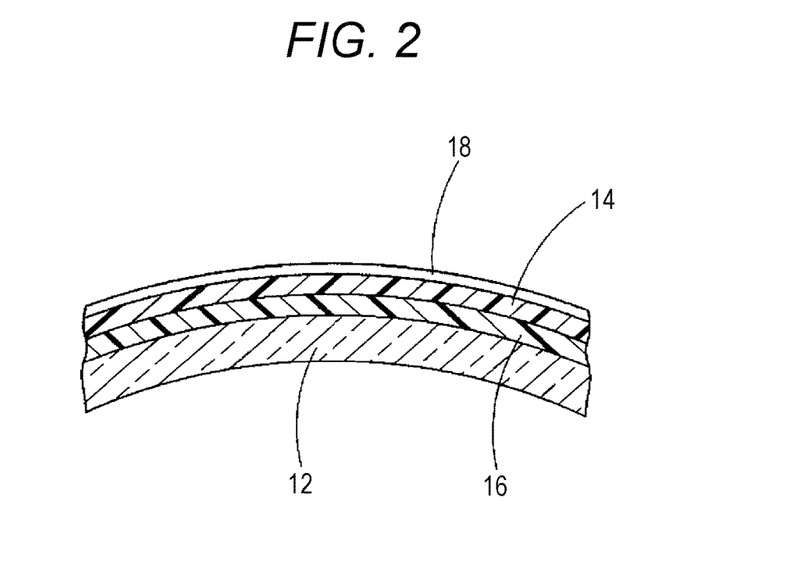
FIG. 2 is a schematic sectional view of a layer arrangement of a spectacle lens to which the present invention applied.

Next, a case where the hard coating composition of the above configuration is applied to a lens base material 12 will be described taking FIG. 2 as an example.

The lens base material 12 is preferably applied to an organic glass lens base material for spectacles having high refraction (refractive index 1.60 to 1.74). Because it is possible to simultaneously solve problems of interference fringes, dyeing properties and weatherability in the organic glass lens base material having high refraction (see Tables 2 and 3).

As specific examples of the organic glass lens base material for spectacles having high refraction, those made of thiourethane resin or urethane acrylic resin having a refractive index of 1.61 (ne value), those made of thiourethane resin having a refractive index of 1.67 (ne value), and those made of thioepoxy resin (episulfide resin) having a refractive index of 1.71 (ne value) or a refractive index of 1.74 (ne value) are commercially available (see Uchida [0093] to [0097]).

Methods of coating the lens base material 12 include brush coating, dipping, roller coating, spray coating, spin coating and the like. An example of drying and curing conditions is 80° C. to 150° C., particularly preferably 100° C. to 120° C. for 1 to 5 hours, and the coating film obtained after curing has a thickness of 0.5 to 20 μm.

Pretreatment methods of an object to be coated include degreasing washing with an acid-alkali washing solvent, plasma treatment, ultrasonic washing and the like.

In general, a conventional primer layer 16 is formed between a hard coat 14 formed of the above hard coating composition and the lens base material 12 for the purpose of improving impact resistance and adhesion, and an antireflection film 18 can be further formed on an upper surface of the hard coat.

The specific examples of the primer layer include those described in Uchida [0104], and the specific examples of the antireflection film include those described in Uchida [0105] to [0110].

EXAMPLES (1) Each composition according to Examples 1, 2 and 3 and Comparative Example 1 will be described below. Furthermore, Uchida's Examples 1, 2 and 3, and Uchida's Comparative Examples 1 and 2 are cited as well.

Table 1-1 shows an alkoxysilane composition of each composition, and Table 1-2 shows a composition of each composition.

Hereinafter, a method of preparing each composition will be specifically described.

In each Example and the like, the composition of alkoxysilane is shown in Table 1-1.

Each abbreviation in Table 1-1 and the following description means each compound.

GOPTS—γ-glycidoxypropyltrimethoxysilane
TMOS—Tetramethoxysilane
TEOS—Tetraethoxysilane

TABLE 1-1

| Composition | Tri-alkoxysilane (First component) | Tetra-alkoxysilane (Second component) | First component/Second component | Sulfide silane (Third component) | First component/Third component | Total silane |
|---|---|---|---|---|---|---|
| Example 1 | GOPTS 150 parts | TMOS 45 parts | 10/3 | TESPD 1 part | 10/0.07 | 196 parts |
| Example 2 | GOPTS 150 parts | TMOS 45 parts | 10/3 | TESPD 2.25 parts | 10/0.15 | 197.3 parts |
| Example 3 | GOPTS 160 parts | TMOS 80 parts | 10/5 | TESPD 4.8 parts | 10/0.3 | 244.8 parts |
| Example 4 | GOPTS 200 parts | TMOS 140 parts | 10/7 | TESPD 10 part | 10/0.5 | 350 parts |
| Comparative Example 1 | GOPTS 200 parts | TMOS 140 parts | 10/7 | TESPD 20 part | 10/1 | 360 parts |
| Uchida's Comparative Example 1 | GOPTS 125 parts | TEOS 110 parts | 10/8.8 | — | — | 235 parts |
| Uchida's Comparative Example 3 | GOPTS 200 parts | TEOS 140 parts | 10/7 | — | — | 340 parts |
| Uchida's Example 1 | GOPTS 200 parts | TEOS 140 parts | 10/7 | — | — | 340 parts |
| Uchida's Example 2 | GOPTS 160 parts | TEOS 80 parts | 10/5 | — | — | 240 parts |
| Uchida's Example 3 | GOPTS 150 parts | TEOS 45 pails | 10/3 | — | — | 195 parts |

TABLE 1-2

| Composition | Total silane | Polycarboxylic acid | Nitrogen-containing compound | Colloid Sol (Solid content) | Fine particles/Amine | Total silane/Fine particles | Total silane/Carboxylic acid | Refractive index of coating film |
|---|---|---|---|---|---|---|---|---|
| Example 1 | 196 parts | Trimellitic anhydride 40 parts | Dicyandiamide 15 parts | Rutile-based 192 parts | 10/0.32 | 10/9.8 | 10/0.2 | 1.71 |
| Example 2 | 197.3 parts | Trimellitic anhydride 40 parts | Dicyandiamide 15 parts | Rutile-based 192 parts | 10/0.32 | 10/9.7 | 10/0.2 | 1.71 |
| Example 3 | 244.8 parts | Trimellitic anhydride 40 parts | Dicyandiamide 15 parts | Rutile-based 143 parts | 10/0.32 | 10/5.8 | 10/1.6 | 1.67 |
| Example 4 | 350 parts | Itaconic acid 48 parts | Dicyandiamide 15 parts | Rutile-based 93 parts | 10/0.32 | 10/2.7 | 10/1.4 | 1.61 |
| Comparative Example 1 | 360 parts | Trimellitic anhydride 48 parts | Dicyandiamide 15 parts | Rutile-based 93 parts | 10/0.32 | 10/2.6 | 10/1.3 | 1.61 |
| Uchida's Comparative Example 1 | 235 parts | Itaconic acid 12 parts | Dicyandiamide 5 parts | Titania composite 54 parts | — | 10/2.3 | 10/0.5 | 1.61 |
| Uchida's Comparative Example 3 | 340 parts | Acetylacetone aluminum 2 parts | | Niobium oxide 93 parts | 10/0.16 | 10/2.7 | — | 1.61 |
| Uchida's Example 1 | 340 parts | Trimellitic anhydride 51 parts | Dicyandiamide 15 parts | Rutile-based I 93 parts | 10/0.16 | 10/2.7 | 10/1.5 | 1.61 |
| Uchida's Example 2 | 240 parts | Itaconic acid 40 parts | Dicyandiamide 15 parts | Rutile-based II 152 parts | 10/0.64 | 10/1.7 | 10/1.7 | 1.67 |
| Uchida's Example 3 | 195 parts | Pyromellitic anhydride 40 parts | Dicyandiamide 15 parts | Rutile-based III 192 parts | 10/1.09 | 10/2.5 | 10/2.5 | 1.71 |

TESPD—Bis (3-triethoxysilylpropyl) disulfide
TESPT—Bis (3-triethoxysilylpropyl) tetrasulfide
Further, each colloidal sol in Table 1-2 means one having the following specifications.

Rutile based—a commercially available colloidal sol having 31% of a nonvolatile content with colloidal particles (median diameter 10 nm) dispersed in methanol and containing 1.0% of diisopropylamine Rutile based I, II and III—those described in Uchida [0114], [0116] and [0118], that is, the colloidal sols containing 0.5%, 2.0% and 3.5% of diisopropylamine Titania composite—a colloidal sol described in Uchida [0120]

Niobium oxide—a colloidal sol described in Uchida [0122]

Example 1

1) Preparation of Alkoxysilane Hydrolyzate 150 parts of GOPTS, 45 parts of TMOS and 1 part of TESPD are diluted with methyl alcohol, and 50 parts of 0.01N hydrochloric acid is added dropwise while stirring to conduct hydrolysis whole day and night.

2) Preparation of Composition

To the hydrolyzate obtained above, 620 parts (192 parts in terms of solid content) of rutile-based colloidal sol, 100 parts of 1-methoxy-2-propanol, 40 parts of trimellitic anhydride, and 15 parts of dicyandiamide were added and stirred whole day and night, filtered through a 1 μm filter, to obtain a hard coating composition coating material having a refractive index of 1.71.

Examples 2 to 4 and Comparative Example 1

A hydrolyzate was prepared in the same manner as in Example 1 by using the alkoxysilane having the composition shown in Table 1-1, and the polyvalent carboxylic acid, the nitrogen-containing compound and the colloidal sol shown in Table 1-2 were added to the hydrolyzate in the indicated amounts, to prepare a composition having the indicated refractive index in the same manner as in Example 1.

Uchida's Examples 1 to 3 and Uchida's Comparative Examples 1 and 3

They were respectively prepared by methods described in sections of Uchida's Examples 1 to 3 and Comparative Examples 1 and 3.

That is, a hydrolyzate was prepared in the same manner as in Example 1 by using the alkoxysilane having the composition shown in Table 1-1, and the polyvalent carboxylic acid, the nitrogen-containing compound and the colloidal sol shown in Table 1-2 were added to the hydrolyzate in the indicated amounts, to prepare a composition having the indicated refractive index in the same manner as in Example 1.

However, in Uchida's Comparative Example 3, the curing agent (polycarboxylic acid and nitrogen-containing compound) was replaced by an acetylacetone metal salt.

(2) Product Characteristic Test (2-1) Preparation of Test Piece

Commercially available products having the following refractive indexes prepared from the following thiourethane resins (a), (b) and the episulfide resin (c) were used as spectacle lenses which are base materials.
(a) Thiourethane resin 1.61 (ne value)
(b) Thiourethane resin 1.67 (ne value)
(c) Episulfide resin 1.74 (ne value)

1) Test pieces of hard coat treated products (HD treated products) were prepared as follows.

Each lens shown in Tables 2 and 3 is immersed in each of the above compositions (coating materials) and pulled up at 130 mm/min. After coating, the lens is preliminarily dried at 100° C. for 20 minutes and then heat cured at 120° C. for 3 hours. Note that test pieces for abrasion resistance evaluation separately prepared using the above (a) as the lens base material.

2) Hard coat/antireflection film treated product (HD+AR treated product) was prepared as follows.

An antireflection film having the following inorganic substance composition was formed on the lens base material on which the hard coat was formed in the above 1) by a vacuum evaporation method.

$$SiO_2/ZrO_2:\tfrac{1}{4}\lambda, ZrO_2:\tfrac{1}{2}\lambda, SiO_2:\tfrac{1}{4}\lambda \qquad (\alpha)$$

Three test pieces were prepared for each test item except for an elapsed test, and the test results were evaluated by an intermediate value or an average value.

(2-2) Initial Characteristic Test

For each HD treated product and HD+AR treated product prepared in the above (2-1), each indicated product characteristic test was performed on initial characteristics.

A coating film thickness (hard film thickness) and the refractive index were obtained using a reflectometer "Model USPM-RU-2" manufactured by Olympus Corporation.

1) Appearance

The interference fringes and transparency were visually observed and evaluated according to the following criteria.

Interference fringes—Excellent: None at all, Good: Inconspicuous, NG—Noticeable, Transparency—Good: Clear, NG: Slightly cloudy 2) Abrasion Resistance (Bayer Value)

A reciprocating abrasion test was carried out on a test piece lens and a standard lens (without a hard coat) using a Bayer tester manufactured by COLTS Laboratories under the following conditions (n=3).

Atmosphere: room temperature 23° C., humidity 50%, Test sand: Kryptonite B,

Amplitude: 600 mm, cycle 150 times/minute, 4 minutes

Before and after this abrasion test, haze was measured on the test piece lens and the standard lens using a Haze meter "NDH-5000" manufactured by Nippon Denshoku Industries Co., Ltd.

Then, the Bayer value is obtained by the following equation.

Bayer value=$\Delta H2$ (a change amount of haze value of standard lens)/$\Delta H1$ (a change amount of haze value of test piece lens)

3) Dyeability

Transmittance of the dyeing test piece lens prepared by dyeing the test piece lens of HD treated product under the following conditions was measured with a spectrophotometer "U4100" manufactured by Hitachi, Ltd.

2 parts of the disperse dye "Seiko-Brown" and 0.5 parts of the dispersant "Diapon T" were dissolved in 1 liter of pure water and immersed in a dyeing bath at a liquid temperature of 92° C. for 5 minutes.

4) Adhesion

One hundred grid square cuts reaching the base material of 1 mm were made on each of the convex and concave coating film surfaces with a steel knife from the top of the coating film, and a cellophane adhesive tape (manufactured by Nichiban Co., Ltd.) was stuck strongly and peeled off rapidly in the direction of 90 degrees, and the remaining number (no dot-like or linear peeling) was counted. The adhesion was displayed as "convex surface remaining number/concave surface remaining number" in each cell of the tables.

(2-3) Weatherability Test

An exposure test of each HD treated product and HD+AR treated product prepared in the above (2-1) was performed for each of the following times using an accelerated weatherability tester ("Sunshine Weather Meter S300" manufactured by Suga Test Instruments Co., Ltd.).

HD treated product—100 hours and 200 hours
HD+AR treated product—200 hours and 300 hours Each test piece was subjected to the following tests: (i) adhesion (ii) appearance visual inspection (200 hours exposure), and (iii) measurement of decrease in a change amount of transmittance (200 hours exposure).

(2-4) Light Resistance Test

The test piece lens was continuously irradiated with UVA 340 nm at 60° C. for 40 hours using a Q-SUN/Xe-1 Xenon accelerated light resistance tester manufactured by Q-PANEL.

The test piece lens was prepared by applying a hard coat composition to a test piece base material and dyeing it in the same manner as in the above dyeing test until 50% coloring, then applying the antireflection film thereto.

Then, the transmittance was measured before and after irradiation with ultraviolet light, and an amount of change (%) was obtained.

TABLE 2

| | | | | Test Examples (refractive index of coating film) | | | | |
|---|---|---|---|---|---|---|---|---|
| | | | | Example 1 (1.71) | | Example 2 (1.71) | | Example 3 (1.67) |
| | | | | Type of lens, Refractive index | | | | |
| | | | | (b) 1.67 | (c) 1.74 | (b) 1.67 | (c) 1.74 | (a) 1.61 |
| HD treated product | Coating film thickness | | d: μm | 1.9 | 1.9 | 2 | 2 | 2.6 |
| | Initial characteristics | Appearance | Interference fringes | Good | Good | Good | Good | Good |
| | | | Transparency | Good | Good | Good | Good | Good |
| | | Abrasion resistance | Bayer value | 2.5 | | 2.5 | | 2.3 |
| | | Dyeability | Transmittance, % | 84 | 91 | 82 | 89 | 83 |
| | | | Adhesion | 100/100 | 100/100 | 100/100 | 100/100 | 100/100 |
| | Weatherability | Adhesion | 100 hours irradiation | 100/100 | 100/100 | 100/100 | 100/100 | 100/100 |
| | | | 200 hours irradiation | 90/90 | 80/80 | 100/100 | 100/100 | 100/100 |
| | | Visual appearance (200 hours irradiation) | | no change | no change | no change | no change | no change |
| HD + AR treated product | Initial characteristics | Abrasion resistance | Bayer value | 4 | | 4 | | 3.8 |
| | | | Adhesion | 100/100 | 100/100 | 100/100 | 100/100 | 100/100 |
| | Weatherability | Adhesion | 200 hours irradiation | 100/100 | 100/100 | 100/100 | 100/100 | 100/100 |
| | | | 300 hours irradiation | 97/98 | 95/95 | 100/100 | 100/100 | 100/100 |
| | | Visual appearance (200 hours irradiation) | | no change | no change | no change | no change | no change |
| | | Change amount of transmittance, % (200 hours irradiation) | | ∠0.2 | ∠0.5 | ∠0.2 | ∠0.5 | ∠0.2 |
| | | Light resistance test (change amount of transmittance, %) | | ∠11 | no data | ∠11 | no data | ∠10 |

| | | | | Test Examples (refractive index of coating film) | | |
|---|---|---|---|---|---|---|
| | | | | Example 3 (1.67) | Example 4 (1.61) | Comparative Example 1 (1.61) |
| | | | | Type of lens, Refractive index | | |
| | | | | (b) 1.67 | (a) 1.61 | (b) 1.67 | (a) 1.61 | (b) 1.67 |
| HD treated product | Coating film thickness | | d: μm | 2.6 | 3 | 3 | 3.2 | 3.2 |
| | Initial characteristics | Appearance | Interference fringes | Excellent | Excellent | Good | Excellent | Good |
| | | | Transparency | Good | Good | Good | Good | Good |
| | | Abrasion resistance | Bayer value | 2.3 | | 2.2 | | 1.4 |
| | | Dyeability | Transmittance, % | 82 | 85 | 80 | 65 | 62 |
| | | | Adhesion | 100/100 | 100/100 | 100/100 | 100/100 | 100/100 |
| | Weatherability | Adhesion | 100 hours irradiation | 100/100 | 100/100 | 100/100 | 100/100 | 100/100 |
| | | | 200 hours irradiation | 100/100 | 100/100 | 100/100 | 100/100 | 100/100 |

TABLE 2-continued

| | | | | | | | | |
|---|---|---|---|---|---|---|---|---|
| | | | Visual appearance (200 hours irradiation) | no change | no change | no change | no change | no change |
| HD + AR treated product | Initial characteristics | Abrasion resistance | Bayer value | 3.8 | | 3.7 | | 1.8 |
| | | | Adhesion | 100/100 | 100/100 | 100/100 | 100/100 | 100/100 |
| | Weatherability | Adhesion | 200 hours irradiation | 100/100 | 100/100 | 100/100 | 100/100 | 100/100 |
| | | | 300 hours irradiation | 100/100 | 100/100 | 100/100 | 100/100 | 100/100 |
| | | | Visual appearance (200 hours irradiation) | no change | no change | no change | no change | no change |
| | | | Change amount of transmittance, % (200 hours irradiation) | ⊿0.2 | ⊿0.2 | ⊿0.2 | ⊿0.2 | ⊿0.5 |
| | Light resistance test (change amount of transmittance, %) | | | ⊿10 | ⊿11 | ⊿9 | ⊿11 | ⊿11 |

TABLE 3

| | | | | Test Examples (refractive index of coating film) | | | | |
|---|---|---|---|---|---|---|---|---|
| | | | | Uchida's Comparative Example 1 (1.61) | | Uchida's Comparative Example 3 (1.61) | | Uchida's Example 1 (1.61) |
| | | | | Type of lens, Refractive index | | | | |
| | | | | (a) 1.61 | (b) 1.67 | (a) 1.61 | (b) 1.67 | (a) 1.61 |
| HD treated product | | Coating film thickness | d: μm | 3.2 | 3.2 | 2.8 | 2.8 | 2.8 |
| | Initial characteristics | Appearance | Interference fringes | Excellent | Good | Excellent | Good | Excellent |
| | | | Transparency | NG | NG | Good | Good | Good |
| | | Abrasion resistance | Bayer value | 1.5 | | 1.7 | | 2.3 |
| | | Dyeability | Transmittance, % | 86 | 87 | 86 | 87 | 86 |
| | | | Adhesion | 100/100 | 100/100 | 100/100 | 100/100 | 100/100 |
| | Weatherability | Adhesion | 100 hours irradiation | 50/50 | 50/50 | 0/15 | 0/10 | 100/100 |
| | | | 200 hours irradiation | 25/25 | 15/15 | 0/0 | 0/0 | 70/70 |
| | | | Visual appearance (200 hours irradiation) | overall cracks | overall cracks | no change | no change | no change |
| HD + AR treated product | Initial characteristics | Abrasion resistance | Bayer value | 1.8 | | 3.7 | | 3.7 |
| | | | Adhesion | 100/100 | 100/100 | 100/100 | 100/100 | 100/100 |
| | Weatherability | Adhesion | 200 hours irradiation | 65/65 | 50/50 | 20/25 | 10/20 | 100/100 |
| | | | 300 hours irradiation | 25/25 | 20/20 | 0/0 | 0/0 | 85/88 |
| | | Visual appearance (200 hours irradiation) | | brown discoloration | brown discoloration | blue discoloration | blue discoloration | no change |
| | | Change amount of transmittance, % (200 hours irradiation) | | ⊿1.9 | ⊿2 | ⊿1.9 | ⊿1.9 | ⊿0.2 |
| | Light resistance test (change amount of transmittance, %) | | | ⊿25 | ⊿26 | ⊿10 | ⊿10 | ⊿11 |

| | | | | Test Examples (refractive index of coating film) | | | | |
|---|---|---|---|---|---|---|---|---|
| | | | | Uchida's Example 1 (1.61) | Uchida's Example 2 (1.67) | | Uchida's Example (1.71) | |
| | | | | Type of lens, Refractive index | | | | |
| | | | | (b) 1.67 | (b) 1.67 | (c) 1.74 | (b) 1.67 | (c) 1.74 |
| HD treated product | | Coating film thickness | d: μm | 2.8 | 2.5 | 2.5 | 1.9 | 1.9 |
| | Initial characteristics | Appearance | Interference fringes | Good | Excellent | Good | Good | Good |
| | | | Transparency | Good | Good | Good | Good | Good |
| | | Abrasion resistance | Bayer value | 2.3 | 2.4 | | 2.6 | |

TABLE 3-continued

| | | | | | | | | | |
|---|---|---|---|---|---|---|---|---|---|
| | | Dyeability | Transmittance, % | | 82 | 85 | 83 | 84 | 91 |
| | | | Adhesion | | 100/100 | 100/100 | 100/160 | 100/100 | 100/100 |
| | Weatherability | Adhesion | 100 hours irradiation | | 100/100 | 100/100 | 100/100 | 100/100 | 100/100 |
| | | | 200 hours irradiation | | 65/65 | 65/65 | 60/60 | 65/70 | 55/55 |
| | | Visual appearance (200 hours irradiation) | | | no change | no change | no change | no change | no change |
| HD + AR treated product | Initial characteristics | Abrasion resistance | Bayer value | | 3.7 | | 3.8 | | 4 |
| | | | Adhesion | | 100/100 | 100/100 | 100/100 | 100/100 | 100/100 |
| | Weatherability | Adhesion | 200 hours irradiation | | 100/100 | 100/100 | 100/100 | 100/100 | 100/100 |
| | | | 300 hours irradiation | | 80/85 | 85/88 | 85/85 | 85/85 | 80/80 |
| | | Visual appearance (200 hours irradiation) | | | no change | no change | no change | no change | no change |
| | | Change amount of transmittance, % (200 hours irradiation) | | | ⊿0.2 | ⊿0.2 | ⊿0.2 | ⊿0.2 | ⊿0.5 |
| | Light resistance test (change amount of transmittance, %) | | | | ⊿9 | ⊿10 | ⊿10 | ⊿11 | no data |

<<Test Results and Discussion>>

Tables 2 and 3 show the above-mentioned characteristic test results. Correspondence relationship between each Example and each Uchida's Example is as follows. They are identical in a ratio of the first component/the second component and the refractive index of the coating film.

| Examples of the present invention | Uchida's Examples | First component/ Second component | Refractive index |
|---|---|---|---|
| 1, 2 | 3 | 10/3 | 1.71 |
| 3 | 2 | 10/5 | 1.67 |
| 4 | 1 | 10/7 | 1.61 |

Regarding the HD treated product, each Example of the present invention only slightly decreases in the abrasion resistance (Bayer value) as compared with the corresponding Uchida's Example, and shows at least Bayer value of 2.2 or more.

And, it is remarkably excellent in the weatherability (adhesion after 200 hours irradiation). That is, even in Example 1 in which an additional amount of the third component is as small as the first component/the third component=0.07, it is remarkably excellent for the base material refractive indexes of 1.67 and 1.74. However, as in Comparative Example 1, it is found that it is difficult to ensure the abrasion resistance if the first component/the third component=1 and excessive. The weatherability (adhesion after 200 hours irradiation) is 90/90 and 80/80 for the base material refractive indexes of 1.67 and 1.74, and is remarkably more excellent than 65/70 and 55/55 of Uchida's Example 3. Naturally, Example 2 in which the first component/the third component=0.15 is further excellent as 100/100 in the weatherability (adhesion after 200 hours irradiation).

From Uchida's Examples and Uchida's Comparative Examples 1 and 3, it is understood that the colloidal sol, which is the refractive index control agent in the present invention, is also advantageous in the abrasion resistance and the weatherability (adhesion) by using the rutile-based colloid containing the amine dispersant and by combining the polyvalent organic carboxylic acid and the nitrogen-containing compound as the auxiliary agent.

In addition, when the rutile-based colloid is used, it is understood that when its absolute amine content increases, a tendency of increasing the abrasion resistance of the second component (tetraalkoxysilane) is reversed (see Examples 1 to 4, and Uchida's Examples 1 to 3).

Regarding the HD+AR treated product, each Example is not influenced by an additional amount of sulfide silane in the abrasion resistance (Bayer value) and shows the Bayer value of 3.7 or more as compared with the corresponding Uchida's Examples. It is conceivable that the Bayer value greatly depends on the antireflection film (inorganic oxide film).

And, it is remarkably excellent in the weatherability (adhesion after 300 hours irradiation). That is, even in Example 1 in which the component additional amount of the third component is as small as first component/third component=0.07, the weatherability (adhesion after 300 hours irradiation) is 97/98 and 95/95 for the base material refractive indexes of 1.67 and 1.74, and has a significant difference from 85/85 and 80/80 of the Uchida's Example 3. Naturally, Example 2 in which first component/third component=0.15 is further excellent as 100/100 in the weatherability (adhesion after 300 hours irradiation).

From Tables 1-1, 1-2 and Table 3, it is found that the first component/the second component 10/2.5 to 10/7.5, and the first component/the third component 10/0.1 to 10/0.6 are more preferable.

In the above examples, the refractive index control agent (rutile-based colloidal sol containing the amine dispersant) of the coating film is used, however, the present invention can also be applied to fashion glasses which do not require the refractive index control agent like sunglasses, and the refractive index control agent is not required in that case.

What is claimed is:

1. A hard coating composition applied to an optical element body formed of organic glass, wherein
the hard coating composition comprises as coating film-forming components a hydrolyzate of alkoxysilane as a main agent, a polyvalent organic carboxylic acid and a nitrogen-containing compound as auxiliary agents, and a metal oxide colloid as a refractive index control agent, the alkoxysilane substantially comprises:
a first component: a trialkoxysilane represented by a rational formula (where $R^1$ is H or $CH_3$, $R^2$ is an alkylene group having 1 to 4 carbon atoms, and $R^3$ is an alkyl group having 1 to 4 carbon atoms);
a second component: a tetraalkoxysilane represented by a rational formula $Si(OR^4)_4$ (where $R^4$ is an alkyl group having 1 to 4 carbon atoms); and
a third component: a sulfide bonded trialkoxysilane represented by a rational formula $(C_3H_6—Si(O—R^5)_3)_2Sx$ (where $R^5$ is an alkyl group having 1 to 2 carbon atoms and x is an integer of 1 to 5), and
the first component and the second component are blended to have practical abrasion resistance (a Bayer value of 2.0 or more only with a hard coat) and a blending amount of the third component is an amount not impairing the practical abrasion resistance.

2. The hard coating composition according to claim 1, wherein
a mixing ratio of the second component and the third component to the first component is set to the following range:
the first component/the second component≈10/2 to 10/8; and
the first component/the third component≈10/0.05 to 10/0.7.

3. The hard coating composition according to claim 1, wherein
a mixing ratio of the second component and the third component to the first component is set to the following range:
the first component/the second component≈10/2.5 to 10/7.5; and
the first component/the third component≈10/0.1 to 10/0.6.

4. The hard coating composition according to claim 2, wherein the metal oxide colloid is a rutile-based titania colloid having a particle diameter of 5 to 60 nm dispersed using an amine dispersant, and the amine dispersant is contained in an amount of 0.3 to 5.0 parts with respect to 100 parts of the titania colloid.

5. The hard coating composition according to claim 3, wherein the metal oxide colloid is a rutile-based titania colloid having a particle diameter of 5 to 60 nm dispersed using an amine dispersant, and the amine dispersant is contained in an amount of 0.3 to 5.0 parts with respect to 100 parts of the titania colloid.

6. A spectacle lens comprising a hard coat formed of the hard coating composition according to claim 5 on one side or both sides of a lens base material formed of an organic glass lens for spectacles having a refractive index of 1.60 to 1.74.

7. The spectacle lens according to claim 6, wherein a primer layer made of a thermoplastic elastomer composition whose refractive index is adjusted with a metal oxide colloid is further formed between the hard coat and the lens base material.

8. The spectacle lens according to claim 7, wherein the thermoplastic elastomer composition comprises a thermoplastic urethane as a base polymer, and the metal oxide colloid is a rutile-based titania colloid having a particle diameter of 5 to 60 nm dispersed using an amine dispersant.

9. The spectacle lens according to claim 6, wherein an antireflection film of an inorganic substance is further laminated on the hard coat to have a Bayer value of 3.5 or more in practical abrasion resistance.

10. A hard coating composition applied to an optical element body formed of organic glass, wherein
the hard coating composition comprises as a coating film-forming component a hydrolyzate of alkoxysilane as a main agent,
the alkoxysilane comprises:
a first component: a trialkoxysilane represented by a rational formula (where $R^1$ is H or $CH_3$, $R^2$ is an alkylene group having 1 to 4 carbon atoms, and $R^3$ is an alkyl group having 1 to 4 carbon atoms);
a second component: a tetraalkoxysilane represented by a rational formula $Si(OR^4)_4$ (where $R^4$ is an alkyl group having 1 to 4 carbon atoms); and
a third component: a sulfide bonded trialkoxysilane represented by a rational formula $(C_3H_6—Si(O—R^5)_3)_2Sx$ (where $R^5$ is an alkyl group having 1 to 2 carbon atoms and x is an integer of 1 to 5), and
the first component and the second component are blended to have practical abrasion resistance and a blending amount of the third component is an amount not impairing the practical abrasion resistance.

* * * * *